UNITED STATES PATENT OFFICE.

EMIL FISCHER, OF BERLIN, GERMANY, ASSIGNOR TO SYNTHETIC PATENTS CO., INC., OF NEW YORK, N. Y., A CORPORATION OF NEW YORK.

IRON SALTS OF HIGH MOLECULAR FATTY ACIDS CONTAINING ARSENIC AND A HALOGEN.

1,101,734. Specification of Letters Patent. Patented June 30, 1914.

No Drawing. Application filed August 12, 1913. Serial No. 784,380.

*To all whom it may concern:*

Be it known that I, EMIL FISCHER, doctor of philosophy, professor of chemistry, citizen of the German Empire, residing at Berlin, Germany, have invented new and useful Improvements in Iron Salts of High Molecular Fatty Acids Containing Arsenic and a Halogen, of which the following is a specification.

This invention relates to new iron salts of high molecular fatty acid containing arsenic and a halogen; and more particularly to the iron salts of the chlorarsenobehenolic acid, which have proved to be valuable therapeutic compounds.

In my earlier application, Serial No. 717247, filed August 27, 1912, I have described and claimed generically the derivatives and salts of high molecular fatty acids containing arsenic and a halogen; and in my companion application, Serial No. 784,379 filed August 12, 1913 I have claimed generically the metal salts of such acids which are difficultly soluble in water and which retain the valuable therapeutic qualities of the fatty acids.

The present application relates specifically to the iron salts of such acids.

The following specific example further illustrates the present invention. In this example the iron salt of chlorarsenobehenolic acid and its method of preparation are described. 60 parts of chlorarsenobehenolic acid are dissolved in 400 parts of alcohol and while stirring added to a mixture of 1200 parts of basic ferric oxychlorid solution (the liquor ferri oxychlorati dialysati of the *German Pharmacopœia*, 5th edition) and 1200 parts of alcohol. In this way a red-brown precipitate is obtained which is the basic iron salt of chlorarsenobehenolic acid. The precipitate is filtered off, repeatedly stirred with alcohol and filtered off. It is first dried by exposure to air and later at 60°. The product forms a brown powder, insoluble in water and alcohol which is decomposed by mineral acids. It contains about 33.33 per cent. of iron and 5.37 per cent. of arsenic.

The quantities of chlorarsenobehenolic acid and of iron solution may be varied and in this way products may be obtained which show a different ratio of iron and arsenic. Instead of the above liquid iron preparation, basic acetate of iron, or chlorid of iron, or other iron salts may be employed.

I claim:—

1. As a new product an iron salt of a high molecular fatty acid containing arsenic and halogen, which salt is substantially insoluble in water, decomposed by mineral acids setting free the halogenarseno fatty acid, and which retains the valuable therapeutic properties of the free acid, substantially as described.

2. As a new product an iron salt of a high molecular fatty acid containing arsenic and chlorin, which salt is substantially insoluble in water, decomposed by mineral acids setting free the chlorarseno fatty acid, and which retains the valuable therapeutic properties of the free acid, substantially as described.

3. As a new product an iron salt of chlorarsenobehenolic acid, being substantially insoluble in water and alcohol, decomposed by mineral acids setting free the chlorarsenobehenolic acid, and retaining the valuable therapeutic properties of the free acid, substantially as described.

4. As a new product an iron salt of chlorarsenobehenolic acid, being substantially insoluble in water and alcohol, decomposed by mineral acids, and containing about 33.33 per cent. of iron and 5.37 per cent. of arsenic, substantially as described.

In testimony whereof I have hereunto set my hand in the presence of two subscribing witnesses.

EMIL FISCHER.

Witnesses:
HENRY HASPER,
ARTHUR SCHROEDER.